(12) United States Patent
Ikeda

(10) Patent No.: US 12,177,424 B2
(45) Date of Patent: Dec. 24, 2024

(54) IMAGE PROCESSING DEVICE AND IMAGE PROCESSING METHOD

(71) Applicant: Sony Group Corporation, Tokyo (JP)

(72) Inventor: Masaru Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/617,004

(22) PCT Filed: Jun. 16, 2020

(86) PCT No.: PCT/JP2020/023504
§ 371 (c)(1),
(2) Date: Dec. 7, 2021

(87) PCT Pub. No.: WO2020/255940
PCT Pub. Date: Dec. 24, 2020

(65) Prior Publication Data
US 2022/0166975 A1 May 26, 2022

Related U.S. Application Data

(60) Provisional application No. 62/864,189, filed on Jun. 20, 2019.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/176* (2014.11); *H04N 19/82* (2014.11)

(58) Field of Classification Search
None
See application file for complete search history.

(56) References Cited

U.S. PATENT DOCUMENTS

| 2010/0061444 | A1 | 3/2010 | Wilkins |
| 2012/0230397 | A1 | 9/2012 | Ouedraogo |

(Continued)

FOREIGN PATENT DOCUMENTS

| CN | 104025597 A | 9/2014 |
| CN | 108696755 A | 10/2018 |

(Continued)

OTHER PUBLICATIONS

Wang et al., "AHG17: On header parameter set (HPS)," Joint Video Experts Team (JVET) of ITU-T SG 16 WP 3 and ISO/IEC JTC 1/SC 29/WG 11, 13th Meeting: Marrakech, Morocco, Jan. 9-18, 2019, Document: JVET-M0132-v2. (Year: 2019).*

(Continued)

*Primary Examiner* — Reza Aghevli
(74) *Attorney, Agent, or Firm* — XSENSUS LLP

(57) ABSTRACT

The present disclosure relates to an image processing device and an image processing method capable of reducing a mounting load required for image processing.
The decoding unit decodes a bitstream including a parameter set in which the maximum number of the number of parameter sets referenced as the adaptive loop filter is defined as a fixed value to generate a decoded image. The filter unit references the parameter set decoded by the decoding unit and applies the adaptive loop filter to the decoded image generated by the decoding unit. The present technology can be applied to, for example, an image processing system that performs image processing using an adaptive loop filter.

10 Claims, 12 Drawing Sheets

(51) Int. Cl.
*H04N 19/176* (2014.01)
*H04N 19/82* (2014.01)

(56) References Cited

U.S. PATENT DOCUMENTS

| | | | |
|---|---|---|---|
| 2013/0114694 A1* | 5/2013 | Chen | H04N 19/70 |
| | | | 375/240.03 |
| 2013/0188733 A1 | 7/2013 | Van Der Auwera | |
| 2014/0294067 A1 | 10/2014 | Li | |
| 2018/0041778 A1 | 2/2018 | Zhang | |
| 2018/0184123 A1 | 6/2018 | Terada | |
| 2020/0314424 A1* | 10/2020 | Hu | H04N 19/463 |
| 2020/0344473 A1* | 10/2020 | Seregin | H04N 19/174 |
| 2020/0344494 A1* | 10/2020 | Hu | H04N 19/80 |
| 2021/0136363 A1* | 5/2021 | Jang | H04N 19/105 |
| 2021/0314588 A1* | 10/2021 | Yang | H04N 19/70 |
| 2022/0070459 A1* | 3/2022 | Zhang | H04N 19/192 |
| 2022/0116614 A1* | 4/2022 | Zhao | H04N 19/132 |
| 2022/0116615 A1* | 4/2022 | Zhao | H04N 19/186 |
| 2022/0116629 A1* | 4/2022 | Zhao | H04N 19/186 |
| 2022/0141485 A1* | 5/2022 | Nam | H04N 19/11 |
| | | | 375/240.12 |
| 2022/0141488 A1* | 5/2022 | He | H04N 19/172 |
| | | | 375/240.12 |
| 2022/0159249 A1* | 5/2022 | Taquet | H04N 19/186 |
| 2022/0166975 A1* | 5/2022 | Ikeda | H04N 19/70 |
| 2022/0264153 A1* | 8/2022 | Deshpande | H04N 19/187 |
| 2022/0303558 A1* | 9/2022 | Pettersson | H04N 19/30 |

FOREIGN PATENT DOCUMENTS

| | | |
|---|---|---|
| JP | 2015228693 A | 12/2015 |
| WO | WO-2013105458 A1 | 7/2013 |

OTHER PUBLICATIONS

Wenger et al., "Adaptation Parameter Set (APS)," Joint Collaborative Team on Video Coding (JCT-VC) of ITU-T SG16 WP3 and ISO/IEC JTC1/SC29/WG11, 6th Meeting: Torino, Italy, Jul. 14-22, 2011, Document: JCTVC-F747. (Year: 2011).*

International Search Report and Written Opinion dated Aug. 11, 2020, received for PCT Application PCT/JP2020/023504, Filed on Jun. 16, 2020, 9 pages including English Translation.

Wang et al., "AHG17: On Header Parameter Set (HPS)", Joint Video Experts Team (JVET) of ITU-T SG 16 WP 3 and ISO/IEC JTC 1/SC 29/ WG 11, JVET-M0132-v2, Jan. 9-18, 2019, 6 pages.

Ouedraogo et al., "[AHG17/AHG12] On APS id for Bitstream Merging for VVC", Joint Video Experts Team (JVET) of ITU-T SG 16 WP 3 and ISO/IEC JTC 1/SC 29/WG 11, JVET-N0191, Mar. 19-27, 2019, 6 pages.

Wenger et al., "Adaptation Parameter Set (APS)", Joint Collaborative Team on Video Coding (JCT-VC) of ITU-T SG16 WP3 and ISO/IEC JTC1/SC29/WC11, JCTVC-F747r3, Jul. 14-22, 2011, 11 pages.

Bross et al., "Versatile Video Coding (Draft 5)", Joint Video Experts Team (JVET) of ITU-T SG 16 WP 3 and ISO/IEC JTC 1/ SC 29/WG 11, JVET-N1001 (version 7), Mar. 19-27, 2019, 12 pages.

Paluri et al., "AHG17: APS ID Control Mechanism", Joint Video Experts Team (JVET) of ITU-T SG 16 WP 3 and ISO/IEC JTC 1/SC 29/WG 11, JVET-O0561, Jul. 3-12, 2019, 6 pages.

* cited by examiner

FIG. 3

| aps_params_type | Name of aps_params_type | Type of APS parameters |
|---|---|---|
| 0 | ALF_APS | ALF parameters |
| 1 | LMCS_APS | LMCS parameters |
| 2..7 | Reserved | Reserved |

FIG. 4

| LEVEL | MaxAPSIDs ForALF | MAXIMUM LUMINANCE PICTURE SIZE MaxLumaPs (Samples) | MaxSliceSegmentsPerPicture | MaxTileRows | MaxTileCols |
|---|---|---|---|---|---|
| 1 | 8(3bit) | 36,864 | 16 | 1 | 1 |
| 2 | 8(3bit) | 122,880 | 16 | 1 | 1 |
| 2.1 | 8(3bit) | 245,760 | 20 | 1 | 1 |
| 3 | 8(3bit) | 552,960 | 30 | 2 | 2 |
| 3.1 | 8(3bit) | 983,040 | 40 | 3 | 3 |
| 4 | 8(3bit) | 2,228,224 | 75 | 5 | 5 |
| 4.1 | 8(3bit) | 2,228,224 | 75 | 5 | 5 |
| 5 | 16(4bit) | 8,912,896 | 200 | 11 | 10 |
| 5.1 | 16(4bit) | 8,912,896 | 200 | 11 | 10 |
| 5.2 | 16(4bit) | 8,912,896 | 200 | 11 | 10 |
| 6 | 32(5bit) | 35,651,584 | 600 | 22 | 20 |
| 6.1 | 32(5bit) | 35,651,584 | 600 | 22 | 20 |
| 6.2 | 32(5bit) | 35,651,584 | 600 | 22 | 20 |

FIG. 5

| LEVEL | MaxAPSIDs ForALF | MAXIMUM LUMINANCE PICTURE SIZE MaxLumaPs (Samples) | MaxSliceSegmentsPerPicture | MaxTileRows | MaxTileCols |
|---|---|---|---|---|---|
| 1 | x1 | 36,864 | 16 | 1 | 1 |
| 2 | x1 | 122,880 | 16 | 1 | 1 |
| 2.1 | x1 | 245,760 | 20 | 1 | 1 |
| 3 | x1 | 552,960 | 30 | 2 | 2 |
| 3.1 | x1 | 983,040 | 40 | 3 | 3 |
| 4 | x1 | 2,228,224 | 75 | 5 | 5 |
| 4.1 | x1 | 2,228,224 | 75 | 5 | 5 |
| 5 | x2 | 8,912,896 | 200 | 11 | 10 |
| 5.1 | x2 | 8,912,896 | 200 | 11 | 10 |
| 5.2 | x2 | 8,912,896 | 200 | 11 | 10 |
| 6 | x4 | 35,651,584 | 600 | 22 | 20 |
| 6.1 | x4 | 35,651,584 | 600 | 22 | 20 |
| 6.2 | x4 | 35,651,584 | 600 | 22 | 20 |

IMAGE PROCESSING DEVICE AND IMAGE PROCESSING METHOD

CROSS-REFERENCE TO RELATED APPLICATIONS

The present application is based on PCT filing PCT/JP2020/023504, filed Jun. 16, 2020, which claims priority to U.S. Provisional Application No. 62/864,189, filed Jun. 20, 2019, the entire contents of each are incorporated herein by reference.

TECHNICAL FIELD

The present disclosure relates to an image processing device and an image processing method, and more particularly, to an image processing device and an image processing method capable of reducing a mounting load required for image processing.

BACKGROUND ART

Conventionally, as disclosed in Non Patent Document 1, it is possible to switch a parameter set (up to 25 classes per set) of an adaptive loop filter (ALF) in units of coding tree unit (CTU).

For example, there are a maximum of 22 types of parameter sets that can be switched, 16 types of fixed filters whose coefficients are determined by the standard, and 6 types of user-specified filters transmitted by a user using an adaptation parameter set (APS). In addition, the APS is used to transmit parameters.

CITATION LIST

Non-Patent Document

Non Patent Document 1: Benjamin Bross, Jianle Chen, Shan Liu, Versatile Video Coding (Draft 5), JVET-N1001-v7 (version 7—date 2019 May 29)

SUMMARY OF THE INVENTION

Problems To Be Solved By The Invention

However, the current APS specifications have too many degrees of freedom (including ambiguities), so a decoder side needs to always decode the maximum number (=32) of APS IDs unless there are restrictions on how to use it. For this reason, there has been a concern that the mounting load will be high in the past.

The present disclosure has been made in view of such a situation, and makes it possible to reduce a mounting load required for image processing.

Solutions To Problems

An image processing device of the first aspect of the present disclosure includes a decoding unit configured to decode a bitstream including a parameter set in which the maximum number of the number of parameter sets referenced as an adaptive loop filter is defined as a fixed value to generate a decoded image, and a filter unit configured to reference the parameter set decoded by the decoding unit and apply the adaptive loop filter to the decoded image generated by the decoding unit.

An image processing method of the first aspect of the present disclosure includes a decoding process of decoding a bitstream including a parameter set in which the maximum number of the number of parameter sets referenced as an adaptive loop filter is defined as a fixed value to generate a decoded image, and referencing the parameter set decoded in the decoding process and applying the adaptive loop filter to the decoded image generated by a decoding unit.

In the first aspect of the present disclosure, the bitstream including the parameter set in which the maximum number of the number of parameter sets referenced as the adaptive loop filter is defined as the fixed value is decoded to generate the decoded image and references the decoded parameter set to apply the adaptive loop filter to the generated decoded image.

The image processing device of the second aspect of the present disclosure includes a setting unit configured to set the parameter set in which the maximum number of the number of parameter sets referenced as the adaptive loop filter is defined as the fixed value, and an encoding unit configured to encode an image to generate the bitstream including the parameter set by the setting unit.

The image processing method of the second aspect of the present disclosure includes a setting process of setting the parameter set in which the maximum number of the number of parameter sets referenced as the adaptive loop filter is defined as the fixed value, and an encoding process of encoding an image to generate the bitstream including the parameter set in the setting process.

In the second aspect of the present disclosure, the parameter set is set in which the maximum number of the number of parameter sets referenced as the adaptive loop filter is defined as the fixed value, and the image is encoded to generate the bitstream including the set parameter set.

BRIEF DESCRIPTION OF DRAWINGS

FIG. 3 is a diagram illustrating an example of APS parameters type codes.

FIG. 4 is a diagram illustrating an example of the maximum number of APSs defined to be bit-aligned according to a level.

FIG. 5 is a diagram illustrating an example of the maximum number of APSs defined according to the level for each aps_params_type.

MODE FOR CARRYING OUT THE INVENTION

Figure 1:
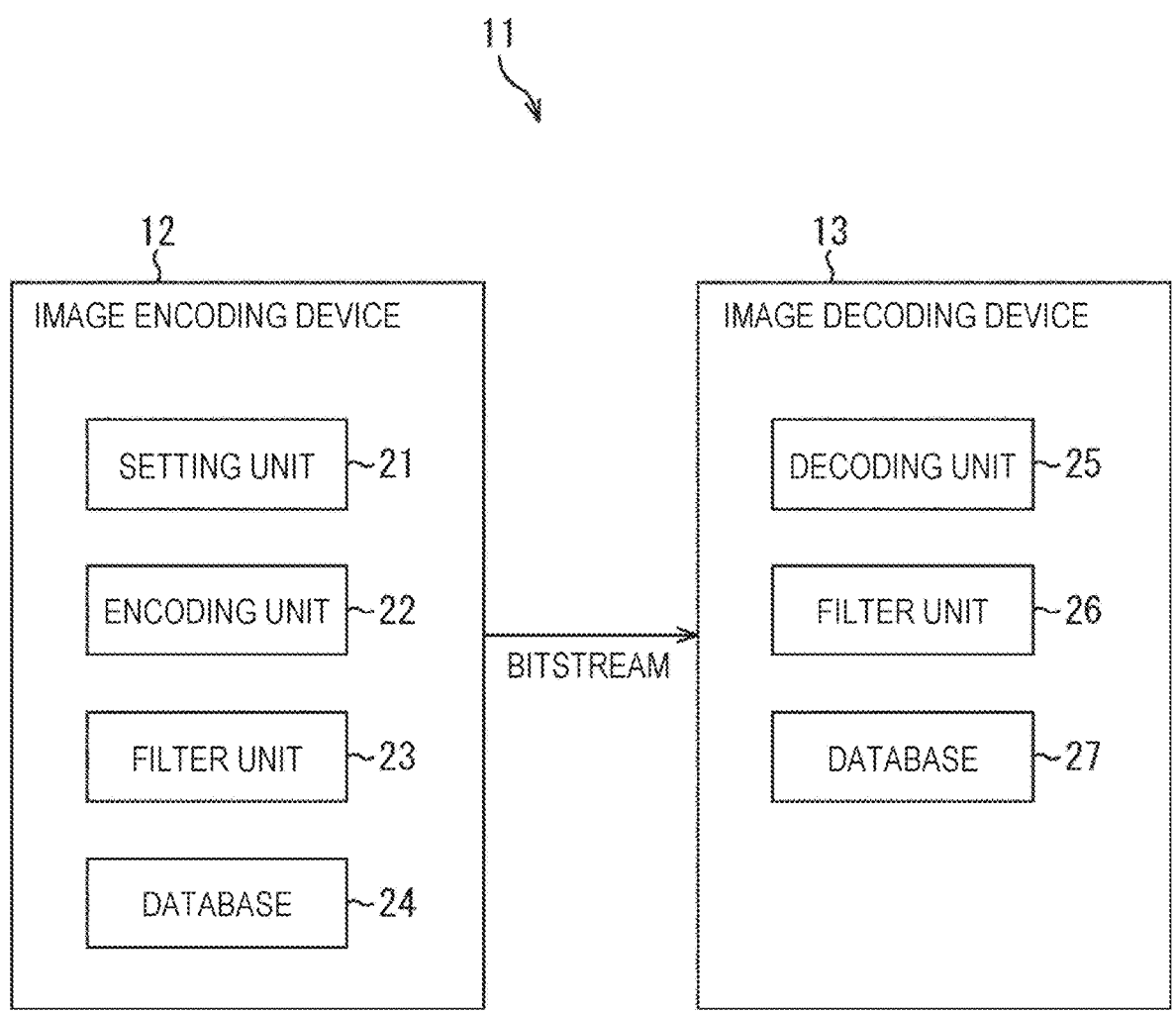
FIG. 1 is a block diagram illustrating a configuration example of an embodiment of an image processing system to which the present technology is applied.

<Document or the Like that Supports Technical Contents and Technical Terms>

The scope disclosed herein is not limited to the contents of embodiments, and the contents of the following references REF 1 to REF 6, which are known at the time of filing, are also incorporated herein by reference. In other words, the contents described in references REF 1 to REF 6 are also the basis for judging the support requirements. In addition, for example, even when technical terms such as parsing, syntax, and semantics are not directly defined in the detailed description of the invention, similarly, they are within the scope of the present disclosure and shall meet the support requirements of the claims.

REF 1 Recommendation ITU-T H. 264 (04/2017) "Advanced video coding for generic audiovisual services", April 2017

REF 2 Recommendation ITU-T H. 265 (02/2018) "High efficiency video coding", February 2018

REF 3 Benjamin Bross, Jianle Chen, Shan Liu, Versatile Video Coding (Draft 5), JVET-N1001-v7 (version 7—date 2019 May 29)

REF 4: Jianle Chen, Yan Ye, Seung Hwan Kim, Algorithm description for Versatile Video Coding and Test Model 5 (VTM 5), JVETN1002-v1

REF 5: Ye-Kui Wang, Hendry, Jianle Chen, Peng Yin, Taoran Lu, Fangjun Pu, Sean McCarthy, AHG17: Signalling of reshaper parameters in APS, JVET-N0117-v1 (version 1—date 2019 Mar. 12)

REF 6: Nael Ouedraogo, Eric Nassor, Jonathan Taquet, Gerald Kergourlay, Frederic Maze, [AHG17/AHG12] On APS id for bitstream merging for VVC, JVET-N0191-v1 (version 1—date 2019 Mar. 12)

<Terms>

In this application, the following terms are defined as follows.

<Block>

Unless otherwise specified, a "block" (not a block indicating a processing unit) used as a partial area or a processing unit of an image (picture) indicates an arbitrary partial area in the picture, and a size, a shape, characteristics, or the like of the block are not limited. For example, the "block" includes any partial area (processing unit) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a conversion block, a sub-block, a macroblock, a tile, or a slice.

<Definition of Block Size>

Further, when specifying a size of such a block, not only the block size may be directly specified, but also the block size may be indirectly specified. For example, the block size may be specified using identification information for identifying the size. Further, for example, the block size may be specified by a ratio or a difference with a size of a reference block (for example, LCU, SCU, or the like). For example, when transmitting information for specifying the block size as a syntax element or the like, information for indirectly specifying the size as described above may be used as the information. By doing so, the amount of the information can be reduced, and the encoding efficiency may be improved. In addition, the specification of the block size also includes the specification of the range of the block size (for example, a specification or the like of a range of an allowable block size).

<Unit of Information/Processing>

A data unit in which various pieces of information is set and a data unit targeted by various types of processing are each arbitrary and are not limited to the above-described examples. For example, these pieces of information or processing may be set for each transform unit (TU), transform block (TB), prediction unit (PU), prediction block (PB), coding unit (CU), largest coding unit (LCU), sub-block, block, tile, slice, picture, sequence, or component, or may target the data in those data units. Of course, this data unit can be set for each information or processing, and it is not necessary that the data unit of all the information or processing is unified. Note that a storage location of these pieces of information is arbitrary, and these pieces of information may be stored in a header, a parameter set, or the like of the above-described data unit. Further, these pieces of information may be stored in a plurality of locations.

<Control Information>

The control information related to the present technology may also be transmitted from the encoding side to the decoding side. For example, control information (for example, enabled_flag) that controls whether the application of the present technology described above is permitted (or prohibited) may be transmitted. Further, for example, the control information indicating a target (or a target to which the present technology is not applied) to which the present technology is applied may be transmitted. For example, the control information that specifies the block size (upper and lower limits, or both) to which the present technology is applied (or permitted or prohibited), frames, components, layers, or the like may be transmitted.

<Flag>

Note that in the present specification, a "flag" is information for identifying a plurality of states, and includes not only information used for identifying two states of true (1) or false (0), but also information capable of identifying three or more states. Therefore, the value that this "flag" can take may be, for example, 2 values of 1/0, or 3 or more values. That is, the number of bits constituting the "flag" is arbitrary, and may be 1 bit or a plurality of bits. Further, since the identification information (including the flag) is assumed to include not only the identification information in the bitstream but also difference information of the identification information which becomes a certain reference information in the bitstream, in the present specification, the "flag" or the "identification information" include not only the information but also the difference information which becomes the reference information.

<Associate Metadata>

Further, various types of information (metadata, or the like) on encoded data (bitstream) may be transmitted or recorded in any form as long as the information is associated with the encoded data. Here, the term "associating" means, for example, to make other data available (linkable) when processing one data. That is, the data associated with each other may be combined as one data or may be individual data. For example, the information associated with the encoded data (image) may be transmitted on a transmission path different from that encoded data (image). Further, for example, the information associated with the encoded data (image) may also be recorded on a recording medium (or another recording area of the same recording medium) different from the encoded data (image). Note that this "association" may be a part of data, not the entire data. For example, an image and information corresponding to the image may be associated with each other in arbitrary units such as a plurality of frames, one frame, or a part within a frame.

In addition, in this specification, the terms such as "synthesize", "multiplex", "add", "integrate", "include", "store", "push into", "put in", and "insert" mean combining a plurality of things into one, for example, combining encoded data and metadata into one data, and means one method of "associating" described above. Further, in the present specification, the encoding includes not only all processing of converting an image into a bitstream, but also a part of the processing. For example, the encoding not only includes processing that includes prediction processing, orthogonal transform, quantization, arithmetic coding, or the like, but also includes processing that collectively refers to quantization and arithmetic coding, processing including prediction processing, quantization, and arithmetic coding, or the like. Similarly, the decoding includes not only all processing of converting a bitstream into an image, but also a part of the processing. For example, the decoding not only includes processing that includes inverse arithmetic decoding, inverse quantization, inverse orthogonal transform, prediction processing, or the like, but also processing that includes inverse arithmetic decoding and inverse quantization, inverse arithmetic decoding, inverse quantization, prediction processing, or the like.

Hereinafter, specific embodiments to which the present technology is applied will be described in detail with reference to the drawings.

Configuration Example of Image Processing System

FIG. 1 is a block diagram illustrating a configuration example of an embodiment of an image processing system to which the present technology is applied.

As illustrated in FIG. 1, an image processing system 11 includes an image encoding device 12 and an image decoding device 13. For example, in the image processing system 11, an image input to the image encoding device 12 is encoded, a bitstream obtained by the encoding is transmitted to the image decoding device 13, and the image decoding device 13 outputs a decoded image decoded from the bitstream.

The image encoding device 12 has a setting unit 21, an encoding unit 22, a filter unit 23, and a database 24, and the image decoding device 13 has a decoding unit 25, a filter unit 26, and a database 27.

The setting unit 21 sets a parameter set in which the maximum number of the number of parameter sets referenced as an adaptive loop filter is defined as a fixed value.

The encoding unit 22 encodes an image to generate a bitstream including a parameter set that is set by the setting unit 21. In this case, the encoding unit 22 encodes an image using a filtered image to which an adaptive loop filter is applied by the filter unit 23.

The filter unit 23 applies an adaptive loop filter to a locally encoded image when the encoding is performed in the encoding unit 22.

The database 24 stores various types of parameters such as filter coefficients required when the encoding unit 22 encodes the image.

The decoding unit 25 decodes a bitstream including a parameter set in which the maximum number of the number of parameter sets referenced as the adaptive loop filter is defined as a fixed value to generate a decoded image.

The filter unit 26 references the parameter set decoded by the decoding unit 25 and applies the adaptive loop filter to the decoded image generated by the decoding unit 25.

The database 27 stores various types of parameters such as filter coefficients required when the decoding unit 25 decodes the image.

Here, in the adaptive loop filter applied in the filter unit 23 and the filter unit 26, a maximum of 6 sets of filter coefficients can be stored in the APS with a current filter coefficient and a filter coefficient in a time direction for one slice. This has 5 layers with time layers (temporal_id) from 0 to 4, and the design is made on the assumption that a total of 6 sets of filter coefficients including 1 set of filter coefficients for each layer and the current 1 set of filter coefficients are stored in the APS.

On the other hand, when one slice is divided into a plurality of tile groups (tile_of_group), data for (6 sets×a plurality of tile groups) is transmitted, and the number of APS IDs increase proportional to the number of tile groups. Therefore, not only the amount of processing for parsing the APS in the image decoding device 13 increases, but also it becomes necessary to increase the buffer size of the database 27 for storing the parameters parsed from the APS.

A usage example of ALF_APS will be described with reference to FIG. 2.

Figure 2:
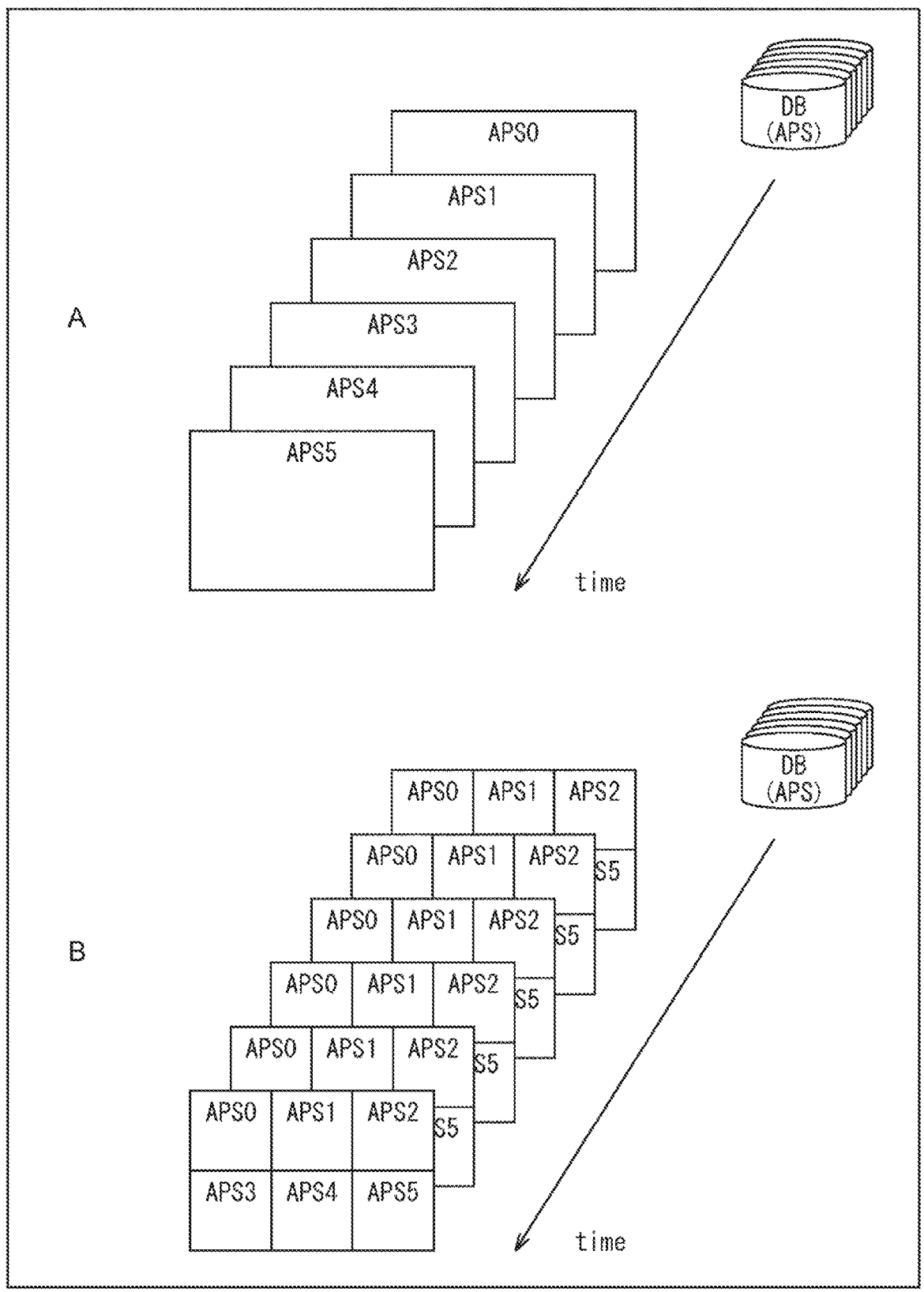
FIG. 2 is a diagram illustrating a usage example of ALF_APS.

As illustrated in A in FIG. 2, the adaptive loop filter can reference up to 6 APSs in units of slice. On the other hand, when the slice is divided into a plurality of tiles, it is possible to reference up to 6 APSs in units of tile.

Therefore, as illustrated in B of FIG. 2, when the slice is divided into 6 tiles, 6 APSs×6 tiles=36 APSs, and the number of APS exceeds the maximum number (=32) of APS IDs.

Also, the number of APS IDs suitable for use will be different depending on use cases (for example, 8K vs. HD, 2D vs. celestial spherical image, or the like). As a result, when there is no usage restriction, the image decoding device 13 needs to prepare a buffer size database 27 that can always expand the maximum number of APS IDs, and the mounting load required for image processing increases.

Therefore, in the image processing system 11, in order to reduce the mounting load required for the image processing, the maximum number (hereinafter, referred to as the maximum number of APSs) of the number of parameter sets (for example, APS) referenced as the adaptive loop filter is set as a fixed value.

First, in a first specification example, the maximum number of APSs is defined for each aps_params_type that specifies a type of APS parameters.

For example, as aps_params_type, 0 and 1 are already used to specify the types of APS parameters, and 2-7 are reserved, as illustrated in FIG. 3. Then, in the case of aps_params_type in which the ALF parameters are used (aps_params_type=0), the maximum number of APSs is defined as 6.

That is, regardless of the number of tile_of_groups, the maximum number of APS IDs that can be referenced as the adaptive loop filter is set as a fixed value. That is, the maximum number of APSs is defined to be a fixed value that does not depend on the number of tiles. However, each of the APS IDs referenced by each tile_of_group may be different. As a result, the maximum number of APS IDs of the adaptive loop filter is defined. In other words, in the first specification example, the maximum number of APS IDs to be used is defined for each aps_params_type.

Next, in the second specification example, the maximum number of APSs is defined to be bit-aligned depending on the level. By defining the maximum number of APSs for each level in this way, it is possible to make the APS specifications suitable for the use case.

FIG. 4 illustrates an example of a second specification example that defines the maximum number of APSs so as to be bit-aligned depending on the level.

In the example illustrated in FIG. 4, the maximum number of APSs is defined in units of byte so that the maximum number of APSs with levels from 1 to 4.1 is 8 (3 bits), the maximum number of APSs with levels from 5 to 5.2 is 16 (4 bits), and the maximum number of APSs with levels from 6 to 6.2 is 32 (5 bits).

In addition, the maximum number of APSs is also defined for the celestial spherical images (for each projection format).

Furthermore, as a third specification example in which the first specification example and the second specification example are combined, the maximum number of APSs may be defined by a multiple of the unit usage number set for each aps_params_type depending on the level. That is, the maximum number of APSs is defined for each aps_params_type and is a fixed value that differs for each level. As a result, the maximum number of APS IDs that can be used for each aps_params_type can change depending on the level. That is, the maximum number of APS IDs is defined by "tool (function)"×"parallelization demand (Level)".

FIG. 5 illustrates an example of the third definition example in which the first definition example and the second definition example are combined.

In the example illustrated in FIG. 5, the maximum number of APSs with levels 1 to 4.1 is defined as 1 times the unit usage number set for each aps_params_type. Also, the maximum number of APSs with levels 5 to 5.2 is defined as twice the unit usage number set for each aps_params_type, and the maximum number of APSs with levels from 6 to 6.2 is defined as four times the unit usage number set for each aps_params_type.

Figure 6:
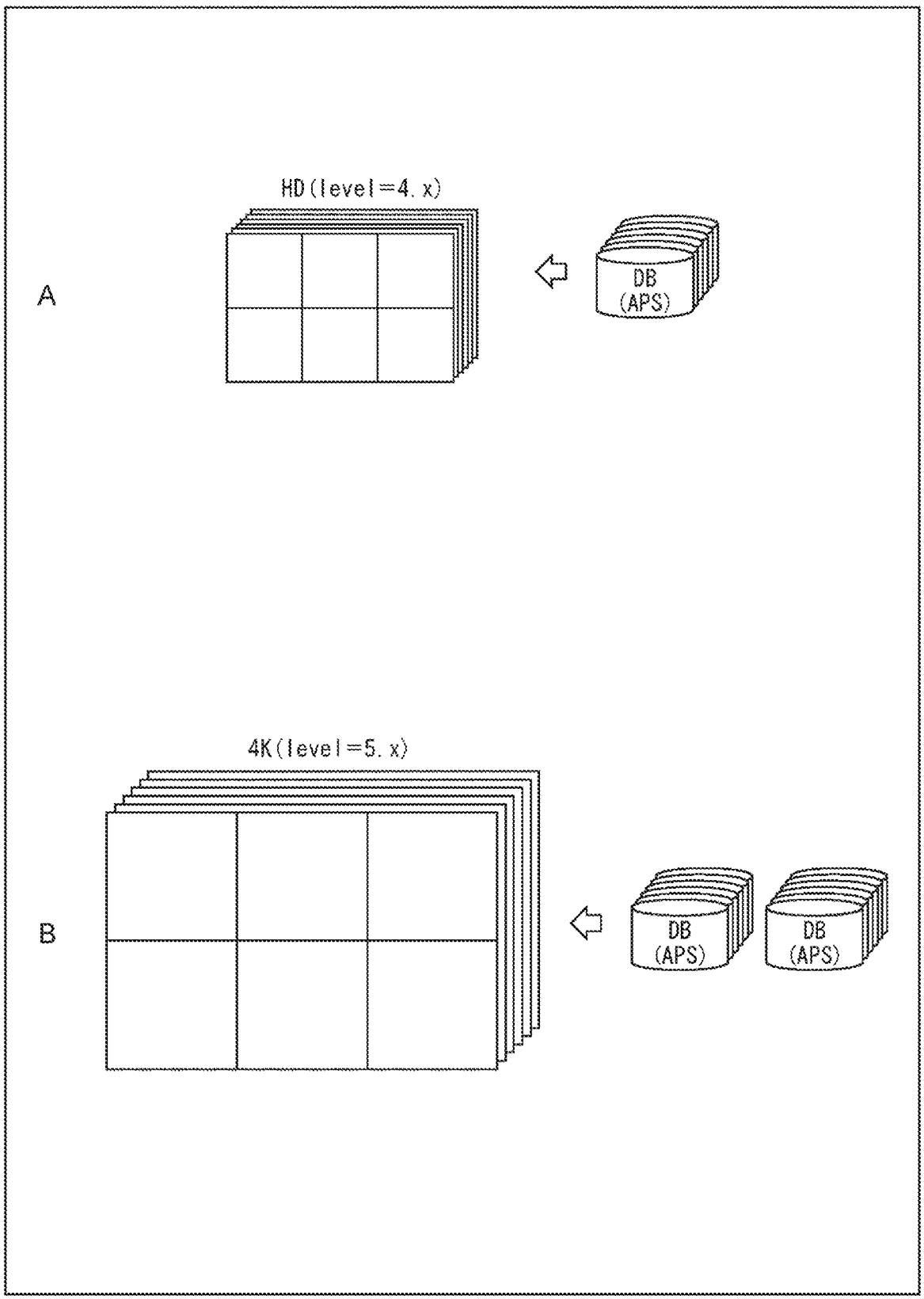
FIG. 6 is a diagram for describing a detailed example of the maximum number of APSs defined according to the level for each aps_params_type.

Specifically, as illustrated in FIG. 6, for the maximum number of APSs in an HD image (level=4.x), the maximum number of APSs in the 4K image (level=5.x) is defined to be twice the unit usage number set for each aps_params_type.

As described above, in the image processing system 11, when encoding and decoding an image, it is possible to use a parameter set in which the maximum number of APSs to be referenced as the adaptive loop filter is defined as a fixed value. In this way, by setting the maximum number of APSs as the fixed value, for example, in the image decoding device 13, it is possible to avoid making the buffer size of the database 27 for storing the parameters parsed from the APS larger than necessary, and reduce the mounting load required for the image processing compared with the related art.

Here, in the present specification, the image means an original image before encoding, and the decoded image means an image output after the decoding processing is performed. A locally decoded image is an image that is output after being locally decoded when encoding an image. The encoded data means data after the image (texture) is encoded, and the bitstream (or encoded bitstream and encoded stream) means data that includes data in which parameters required for encoding or decoding are encoded as well as the encoded data.

In addition, the parameter (encoded parameter) is a general term for data required for encoding or decoding, and is typically a bitstream syntax, a parameter set, or the like. Furthermore, the parameter (encoded parameter) also includes a variable or the like used in a derivation process. In the present disclosure, recognition data that recognizes a plurality of patterns can be set as a bitstream syntax. In this case, the decoder can perform processing more efficiently by parsing and referencing the identification data.

Configuration Example of Computer Base System

Figure 7:
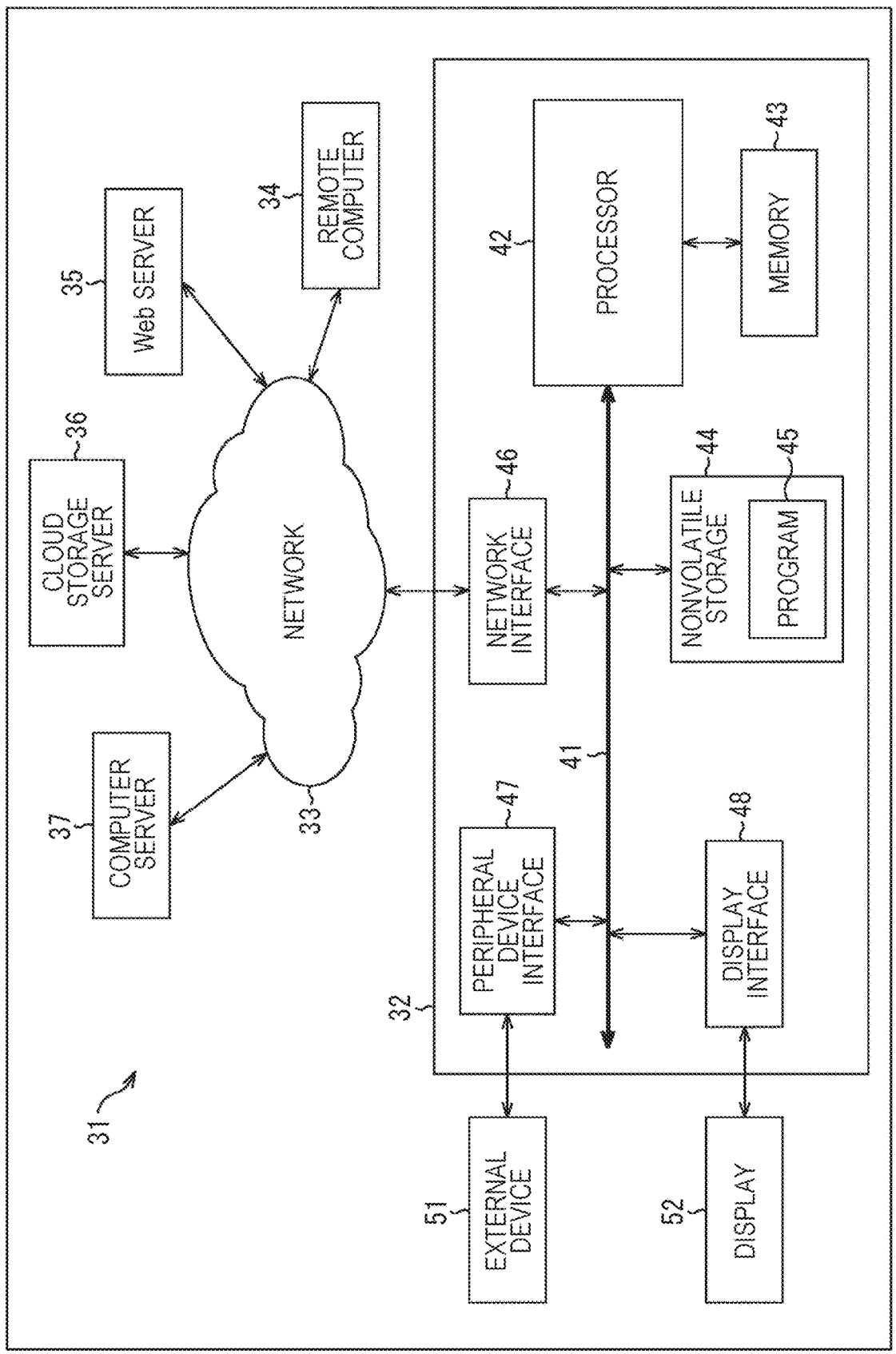
FIG. 7 is a block diagram illustrating a configuration example of an embodiment of a computer base system to which the present technology is applied.

FIG. 7 is a block diagram illustrating a configuration example of an embodiment of a computer base system to which the present technology is applied.

FIG. 7 is a block diagram illustrating a configuration example of a network system in which one or more computers or servers are connected via a network. Note that the hardware and software environment illustrated in the embodiment of FIG. 7 are illustrated as an example of being able to provide a platform for mounting the software and/or methods according to the present disclosure.

As illustrated in FIG. 7, the network system 31 includes a computer 32, a network 33, a remote computer 34, a web server 35, a cloud storage server 36, and a computer server 37. Here, in the present embodiment, a plurality of instances is executed by one or more of the functional blocks illustrated in FIG. 1.

Further, FIG. 7 illustrates the detailed configuration of the computer 32. Note that the functional blocks illustrated in the computer 32 are illustrated for establishing exemplary functions, and are not limited to such a configuration. In addition, the detailed configurations of the remote computer 34, the web server 35, the cloud storage server 36, and the computer server 37 are not illustrated, but they include configurations similar to the functional blocks illustrated within the computer 32.

The computer 32 may be a personal computer, a desktop computer, a laptop computer, a tablet computer, a netbook computer, personal digital assistant, a smartphone, or other programmable electronic device capable of communicating with other devices on the network.

The computer 32 includes a bus 41, a processor 42, a memory 43, a non-volatile storage 44, a network interface 46, a peripheral device interface 47, and a display interface 48. Each of these functions is implemented in an individual electronic subsystem (integrated circuit chip or combination of chips and associated devices) in some embodiments, or in other embodiments, some of the functions are combined and may be mounted on a single chip (system on chip (SoC)).

The bus 41 can employ high speed parallel or serial peripheral interconnect buses of a variety of proprietary or industry standards.

The processor 42 may employ one designed and/or manufactured as one or more single or multi-chip microprocessors.

The memory 43 and the non-volatile storage 44 are storage media that can be read by the computer 32. For example, the memory 43 can employ any suitable volatile storage device such as a dynamic random access memory (DRAM) or a static RAM (SRAM). The non-volatile storage 44 can employ at least one of a flexible disk, a hard disk, a solid state drive (SSD), a read only memory (ROM), an erasable and programmable read only memory (EPROM), a flash memory, a compact disk (CD or CD-ROM), a digital versatile disc (DVD), a card type memory, or a stick type memory.

In addition, a program 45 is stored in the non-volatile storage 44. The program 45 is, for example, a set of machine-readable instructions and/or data used to create, manage, and control specific software functions. Note that in a configuration in which the memory 43 is much faster than the non-volatile storage 44, the program 45 can be transmitted from the non-volatile storage 44 to the memory 43 before being executed by the processor 42.

The computer 32 can communicate and interact with other computers via the network interface 46 and the network 33.

The network 33 can employ a configuration including a wire, a wireless, or an optical fiber connection by, for example, a local area network (LAN), a wide area network (WAN) such as the Internet, or a combination of the LAN and the WAN. In general, a network 33 includes any combination of connections and protocols that support communication between two or more computers and related devices.

The peripheral device interface 47 can input and output data to and from other devices that may be locally connected to the computer 32. For example, the peripheral device interface 47 provides a connection to the external device 51. The external device 51 includes a keyboard, a mouse, a keypad, a touch screen, and/or other appropriate input devices. The external device 51 may also include, for example, a thumb drive, a portable optical or magnetic disk, and a portable computer readable storage medium such as a memory card.

In embodiments of the present disclosure, for example, the software and data used to implement the program 45 may be stored on such a portable computer readable storage medium. In such embodiments, the software may be loaded directly into the non-volatile storage 44 or into the memory 43 via the peripheral device interface 47. The peripheral device interface 47 may use an industry standard such as RS-232 or a universal serial bus (USB) for connection with the external device 51.

The display interface 48 can connect the computer 32 to the display 52, and can be used to present a command line or a graphical user interface to the user of the computer 32 by using the display 52. For example, the display interface 48 can employ industry standards such as a video graphics array (VGA), a digital visual interface (DVI), DisplayPort, and a high-definition multimedia interface (HDMI) (registered trademark).

Configuration Example of Image Encoding Device

Figure 8:
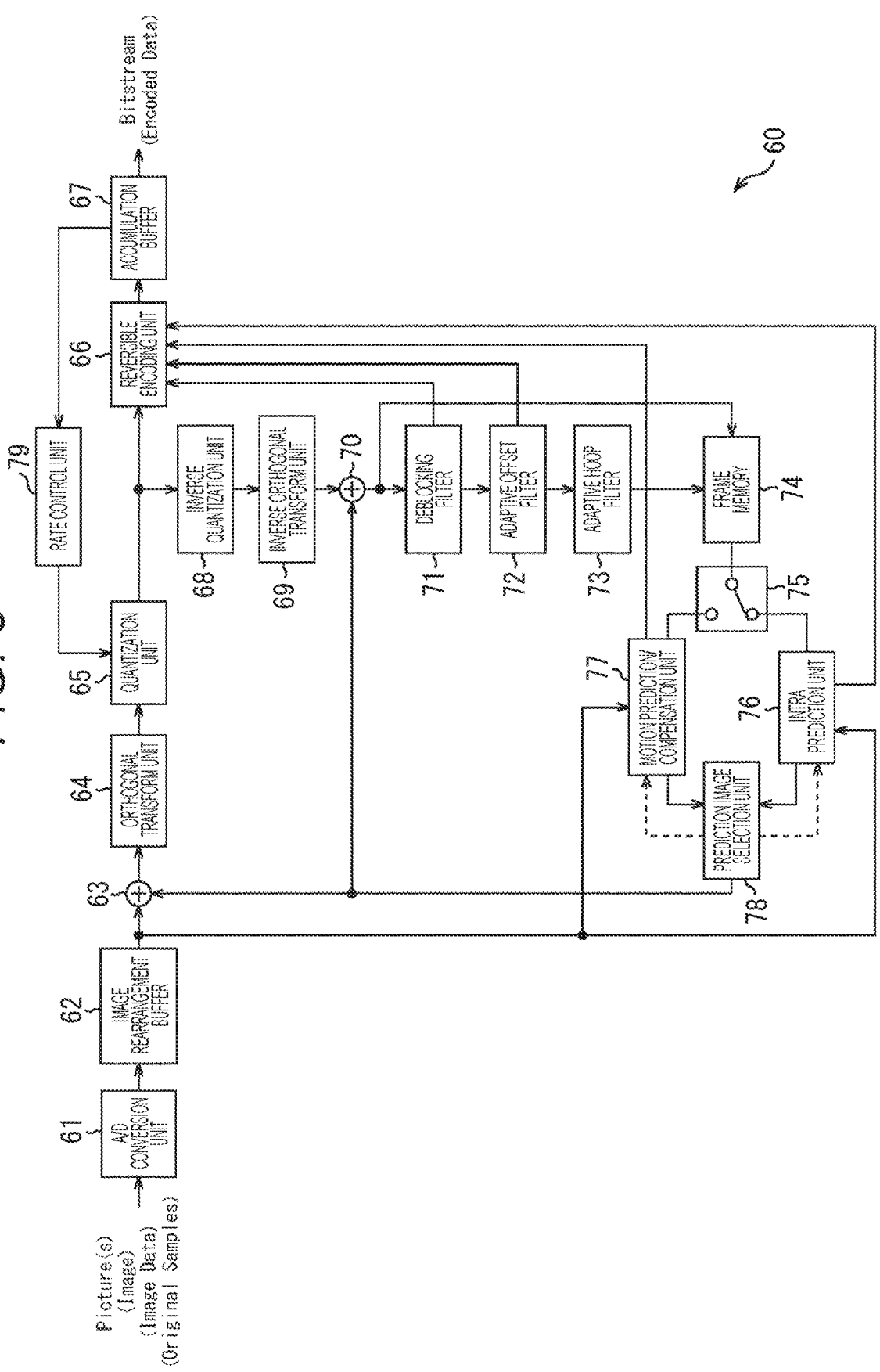
FIG. 8 is a block diagram illustrating a configuration example of an embodiment of an image encoding device.

FIG. 8 illustrates a configuration of an embodiment of the image encoding device as the image processing device to which the present disclosure is applied.

The image encoding device 60 illustrated in FIG. 8 encodes image data using predictive processing. Here, as the encoding method, for example, a high efficiency video coding (HEVC) method or the like is used.

The image encoding device 60 of FIG. 8 has an A/D conversion unit 61, a screen rearrangement buffer 62, a calculation unit 63, an orthogonal transform unit 64, a quantization unit 65, a reversible encoding unit 66, and an accumulation buffer 67. In addition, the image encoding device 60 includes an inverse quantization unit 68, an inverse orthogonal transform unit 69, a calculation unit 70, a deblocking filter 71, an adaptive offset filter 72, an adaptive loop filter 73, a frame memory 74, a selection unit 75, and an intra prediction unit 76, a motion prediction/compensation unit 77, a predicted image selection unit 78, and a rate control unit 79.

The A/D conversion unit 61 A/D-converts the input image data (picture(s)) and supplies the A/D-converted image data to the screen rearrangement buffer 62. Note that the digital data image may be input without providing the A/D conversion unit 61.

The screen rearrangement buffer 62 stores the image data supplied from the A/D conversion unit 61, and rearranges images of frames in the stored display order in the frame order for encoding according to the group of picture (GOP) structure. The screen rearrangement buffer 62 outputs the images in which the frame order is rearranged to the calculation unit 63, the intra prediction unit 76, and the motion prediction/compensation unit 77.

The calculation unit 63 subtracts the prediction image supplied from the intra prediction unit 76 or the motion prediction/compensation unit 77 via the predicted image selection unit 78 from the image output from the screen rearrangement buffer 62, and outputs the difference information to the orthogonal transform unit 64.

For example, in the case of an image to be intra-encoded, the calculation unit 63 subtracts the predicted image supplied from the intra predicted unit 76 from the image output from the screen rearrangement buffer 62. Further, for example, in the case of the image to be inter-encoded, the calculation unit 63 subtracts the predicted image supplied from the motion prediction/compensation unit 77 from the image output from the screen rearrangement buffer 62.

The orthogonal transform unit 64 performs orthogonal transforms such as discrete cosine transform and Karhunen-Loève transform on the difference information supplied from the calculation unit 63, and supplies the conversion coefficients to the quantization unit 65.

The quantization unit 65 quantizes the conversion coefficient output by the orthogonal transform unit 64. The quantization unit 65 supplies the quantized conversion coefficient to the reversible encoding unit 66.

The reversible encoding unit 66 applies reversible coding such as variable length coding and arithmetic coding to the quantized conversion coefficient.

The reversible encoding unit 66 acquires parameters such as information indicating the intra prediction mode from the intra prediction unit 76, and acquires parameters such as information indicating the inter prediction mode or motion vector information from the motion prediction/compensation unit 77.

The reversible encoding unit 66 encodes the quantized conversion coefficient and encodes each acquired parameter (syntax element) to be a part (multiplexed) of the header information of encoded data. The reversible encoding unit 66 supplies the encoded data obtained by encoding to the accumulation buffer 67 for storage.

For example, in the reversible encoding unit 66, reversible coding processing such as variable length coding or arithmetic coding is performed. Examples of the variable length coding include context-adaptive variable length coding (CAVLC) or the like. Examples of the arithmetic coding include context-adaptive binary arithmetic coding (CABAC) or the like.

The accumulation buffer 67 temporarily holds an encoded stream (encoded data) supplied from the reversible encoding unit 66, and outputs the held encoded stream as an encoded image at a predetermined timing, for example, to a recording device or a transmission line (not illustrated) in the subsequent stage. That is, the accumulation buffer 67 is also a transmission unit that transmits the encoded stream.

Further, the conversion coefficient quantized in the quantization unit 65 is also supplied to the inverse quantization unit 68. The inverse quantization unit 68 inversely quantizes the quantized conversion coefficient by a method corresponding to the quantization by the quantization unit 65. The inverse quantization unit 68 supplies the obtained conversion coefficient to the inverse orthogonal transform unit 69.

The inverse orthogonal transform unit 69 inversely orthogonally transforms the supplied transformation coefficient by a method corresponding to the orthogonal transformation processing by the orthogonal transform unit 64. The inverse orthogonal transform output (restored difference information) is supplied to the calculation unit 70.

The calculation unit 70 adds the predicted image supplied from the intra prediction unit 76 or the motion prediction/compensation unit 77 via the predicted image selection unit 78 to the inverse orthogonal transformation result supplied from the inverse orthogonal transform unit 69, that is, the restored difference information and obtains the locally decoded image.

For example, when the difference information corresponds to an image to be intra-encoded, the calculation unit 70 adds the predicted image supplied from the intra prediction unit 76 to the difference information. In addition, for example, when the difference information corresponds to an image to be inter-encoded, the calculation unit 70 adds the predicted image supplied from the motion prediction/compensation unit 77 to the difference information.

The decoded image, which is the result of the addition, is supplied to the deblocking filter 71 and the frame memory 74.

The deblocking filter 71 suppresses a block distortion of the decoded image by appropriately performing the deblocking filter processing on the image from the calculation unit 70, and supplies the filter processing result to the adaptive offset filter 72. The deblocking filter 71 has parameters $\beta$ and Tc obtained based on a quantization parameter QP. The parameters $\beta$ and Tc are threshold values (parameters) used for determining the deblocking filter.

Note that the parameters $\beta$ and Tc of the deblocking filter 71 are extended from $\beta$ and Tc defined by the HEVC method. Each offset of the parameters $\beta$ and Tc is encoded by the reversible encoding unit 66 as a parameter of the deblocking filter and transmitted to the image decoding device 80 of FIG. 10 described later.

The adaptive offset filter 72 performs offset filter (sample adaptive offset (SAO)) processing for mainly suppressing ringing on the image filtered by the deblocking filter 71.

There are 9 types of offset filters: 2 types of band offset, 6 types of edge offset, and no offset. The adaptive offset filter 72 performs the filter processing on the image filtered by the deblocking filter 71 by using a quad-tree structure in which the type of offset filter is determined for each divided area and offset values for each divided area. The adaptive offset filter 72 supplies the filtered image to the adaptive loop filter 73.

Note that in the image encoding device 60, the quad-tree structure and the offset values for each divided area are calculated and used by the adaptive offset filter 72. The calculated quad-tree structure and the offset values for each divided area are encoded by the reversible encoding unit 66 as adaptive offset parameters and transmitted to the image decoding device 80 of FIG. 10 to be described later.

The adaptive loop filter 73 performs adaptive loop filter (adaptive loop filter (ALF)) processing on the image filtered by the adaptive offset filter 72 in a processing unit by using the filter coefficient. In the adaptive loop filter 73, for example, a two-dimensional Wiener filter is used as the filter. Of course, a filter other than the Wiener filter may be used. The adaptive loop filter 73 supplies the filter processing result to the frame memory 74.

Note that although not illustrated in the example of FIG. 8, in the image encoding device 60, the filter coefficient is calculated by the adaptive loop filter 73 for each processing unit so as to minimize the residual from the original image from the screen rearrangement buffer 62. The calculated filter coefficient is encoded by the reversible encoding unit 66 as the adaptive loop filter parameter and transmitted to the image decoding device 80 of FIG. 10 described later.

The frame memory 74 outputs the accumulated reference image to the intra prediction unit 76 or the motion prediction/compensation unit 77 via the selection unit 75 at a predetermined timing.

For example, in the case of the image to be intra-encoded, the frame memory 74 supplies the reference image to the intra prediction unit 76 via the selection unit 75. In addition, for example, in the case of the image to be intra-encoded, the frame memory 74 supplies the reference image to the motion prediction/compensation unit 77 via the selection unit 75.

When the reference image supplied from the frame memory 74 is an image to be intra-encoded, the selection unit 75 supplies the reference image to the intra prediction unit 76. In addition, when the reference image supplied from the frame memory 74 is an image to be inter-encoded, the selection unit 75 supplies the reference image to the motion prediction/compensation unit 77.

The intra prediction unit 76 performs the intra prediction (in-screen prediction) that generates the predicted image using the pixel values in the screen. The intra prediction unit 76 performs the intra prediction in a plurality of modes (intra prediction mode).

The intra prediction unit 76 generates the predicted images in all the intra prediction modes, evaluates each predicted image, and selects the optimum mode. When the optimum intra prediction mode is selected, the intra prediction unit 76 supplies the predicted image generated in the optimum mode to the calculation unit 63 and the calculation unit 70 via the predicted image selection unit 78.

Further, as described above, the intra prediction unit 76 appropriately supplies parameters such as intra prediction mode information indicating the adopted intra prediction mode to the reversible encoding unit 66.

The motion prediction/compensation unit 77 performs the motion prediction on the image to be inter-encoded by using the input image supplied from the screen rearrangement buffer 62 and the reference image supplied from the frame memory 74 via the selection unit 75. Further, the motion prediction/compensation unit 77 performs the motion compensation processing according to the motion vector detected by the motion prediction, and generates the predicted image (inter-predicted image information).

The motion prediction/compensation unit 77 performs the inter-prediction processing in all candidate inter-prediction modes and generates the predicted image. The motion prediction/compensation unit 77 supplies the generated predicted image to the calculation unit 63 or the calculation unit 70 via the predicted image selection unit 78. Further, the motion prediction/compensation unit 77 supplies parameters such as the inter-prediction mode information indicating the adopted inter-prediction mode or the motion vector information indicating the calculated motion vector to the reversible encoding unit 66.

The predicted image selection unit 78 supplies the output of the intra prediction unit 76 to the calculation unit 63 or the calculation unit 70 in the case of the image to be intra-encoded, and supplies the output of the motion prediction/compensation unit 77 to the calculation unit 63 or the calculation unit 70 in the case of the image to inter-encoded.

The rate control unit 79 controls the rate of the quantization operation of the quantization unit 65 based on the compressed image accumulated in the accumulation buffer 67 so that overflow or underflow does not occur.

In this way, the image encoding device 60 is configured, and the reversible encoding unit 66 corresponds to the encoding unit 22 in FIG. 1, and the adaptive loop filter 73 corresponds to the filter unit 23 in FIG. 1 and has a function as the setting unit 21. Therefore, as described above, the image encoding device 60 can reduce the mounting load required for the image processing.

<Operation of Image Encoding Device>

Figure 9:
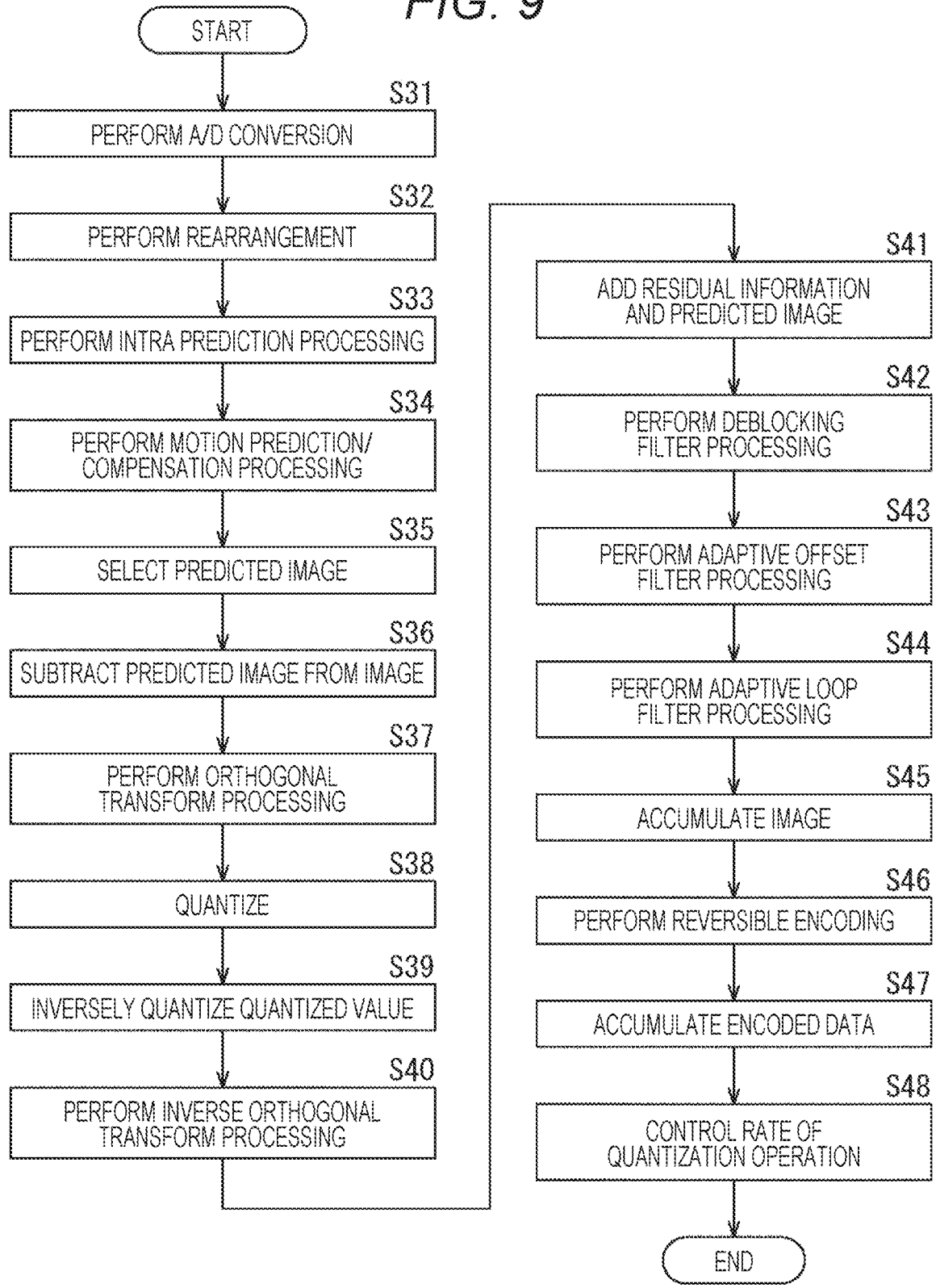
FIG. 9 is a flowchart for describing encoding processing.

The flow of the encoding process executed by the image encoding device 60 as described above will be described with reference to FIG. 9.

In step S31, the A/D conversion unit 61 A/D-converts the input image.

In step S32, the screen rearrangement buffer 62 stores the A/D-converted images by the A/D conversion unit 61, and rearranges the images from the display order of each picture to the encoding order.

When the image to be processed supplied from the screen rearrangement buffer 62 is an image of a block to be intra-processed, the referenced image is read from the frame memory 74, and is supplied to the intra prediction unit 76 via the selection unit 75.

Based on these images, in step S33, the intra prediction unit 76 intra-predicts the pixels of the block to be processed in all the candidate intra-prediction modes. Note that as the decoded pixel to be referenced, the pixel not filtered by the deblocking filter 71 is used.

By this processing, the intra prediction is performed in all the candidate intra prediction modes, and the cost function value is calculated for all the candidate intra prediction modes. Then, the optimum intra prediction mode is selected based on the calculated cost function value, and the predicted image generated by the intra prediction of the optimum intra prediction mode and the cost function value thereof are supplied to the predicted image selection unit 78.

When the image to be processed supplied from the screen rearrangement buffer 62 is an image to be intra-processed, the referenced decoded image is read from the frame memory 74, and is supplied to the motion prediction/compensation unit 77 via the selection unit 75. Based on these images, in step S34, the motion prediction/compensation unit 77 performs motion prediction/compensation processing.

By this processing, the motion prediction processing is performed in all the candidate inter-prediction modes, the cost function values are calculated for all the candidate inter-prediction modes, and the optimum inter-prediction mode is determined based on the calculated cost function values. Then, the predicted image generated by the optimum inter-prediction mode and the cost function value thereof are supplied to the predicted image selection unit 78.

In step S35, the predicted image selection unit 78 determines one of the optimum intra prediction mode and the optimum inter prediction mode as the optimum prediction mode based on each cost function value output from the intra prediction unit 76 and the motion prediction/compensation unit 77. Then, the predicted image selection unit 78 selects the predicted image of the determined optimum prediction mode and supplies the selected predicted image to the calculation units 63 and 70. The predicted image is used for the calculation of steps S36 and S41 described later.

Note that the selection information of the predicted image is supplied to the intra prediction unit 76 or the motion prediction/compensation unit 77. When the predicted image of the optimum intra prediction mode is selected, the intra prediction unit 76 supplies information (that is, parameters related to the intra prediction) indicating the optimum intra prediction mode to the reversible encoding unit 66.

When the predicted image of the optimum inter prediction mode is selected, the motion prediction/compensation unit 77 outputs information indicating the optimum inter prediction mode and the information (that is, parameters related to motion prediction) according to the optimum inter prediction mode to the reversible encoding unit 66. Examples of the information according to the optimum inter prediction mode include motion vector information or reference frame information.

In step S36, the calculation unit 63 calculates the difference between the images rearranged in step S32 and the predicted image selected in step S35. The predicted image is supplied to the calculation unit 63 from the motion prediction/compensation unit 77 in the case of the inter prediction and from the intra prediction unit 76 in the case of the intra prediction via the predicted image selection unit 78, respectively.

The amount of difference data is smaller than that of the original image data. Therefore, the amount of data can be compressed as compared with the case where the image is encoded as it is.

In step S37, the orthogonal transform unit 64 orthogonally transforms the difference information supplied from the calculation unit 63. Specifically, the orthogonal transformation such as discrete cosine transform and Karhunen-Loève transformation is performed, and the conversion coefficient is output.

In step S38, the quantization unit 65 quantizes the conversion coefficient. In this quantization, the rate is controlled as described in the process of step S49 described later.

The difference information quantized as described above is locally decoded as follows. That is, in step S39, the inverse quantization unit 68 inversely quantizes the conversion coefficient quantized by the quantization unit 65 with a characteristic corresponding to the characteristic of the quantization unit 65. In step S40, the inverse orthogonal transform unit 69 inversely orthogonally transforms the transform coefficient inversely quantized by the inverse quantization unit 68 with the characteristics corresponding to the characteristics of the orthogonal transform unit 64.

In step S41, the calculation unit 70 adds the predicted image input via the predicted image selection unit 78 to the locally decoded difference information, and generates the locally decoded (that is, locally decoded) image (image corresponding to the input to the calculation unit 63).

In step S42, the deblocking filter 71 performs the deblocking filter processing on the image output from the calculation unit 70. In this case, as the threshold value for the determination regarding the deblocking filter, the parameters β and Tc extended from β and Tc defined by the HEVC method are used. The filtered image from the deblocking filter 71 is output to the adaptive offset filter 72.

Note that the offsets of the parameters β and Tc used in the deblocking filter 71, which are input by the user by operating the operation unit or the like, are supplied to the reversible encoding unit 66 as the parameters of the deblocking filter.

In step S43, the adaptive offset filter 72 performs the adaptive offset filter processing. By this processing, the adaptive offset filter 72 performs the filter processing on the image filtered by the deblocking filter 71 by using the quad-tree structure in which the type of offset filter is determined for each divided area and the offset values for each divided area. The filtered image is fed to the adaptive loop filter 73.

Note that the determined quad-tree structure and the offset value for each divided region are supplied to the reversible encoding unit 66 as the adaptive offset parameters.

In step S44, the adaptive loop filter 73 performs the adaptive loop filtering processing on the image filtered by the adaptive offset filter 72. For example, the filter processing is performed on the image after filtering by the adaptive offset filter 72 for each processing unit by using the filter coefficient, and the filter processing result is supplied to the frame memory 74.

In step S45, the frame memory 74 stores the filtered image. Note that the images not filtered by the deblocking filter 71, the adaptive offset filter 72, and the adaptive loop filter 73 are also supplied and stored in the frame memory 74 from the calculation unit 70.

On the other hand, the conversion coefficient quantized in step S38 described above is also supplied to the reversible encoding unit 66. In step S46, the reversible encoding unit 66 encodes the quantized conversion coefficient output from the quantization unit 65 and each supplied parameter. That is, the difference image is variable-length-coded such as the arithmetic coding, and compressed. Here, examples of each of the encoded parameters include parameters of the deblocking filter, parameters of the adaptive offset filter, parameters of the adaptive loop filter, the quantization parameters, the motion vector information, the reference frame information, or the prediction mode information, and the like.

In step S47, the accumulation buffer 67 accumulates the encoded difference image (that is, the encoded stream) as the compressed image. The compressed image accumulated in the accumulation buffer 67 is appropriately read out and transmitted to the decoding side via the transmission path.

In step S48, the rate control unit 79 controls the rate of the quantization operation of the quantization unit 65 based on the compressed image accumulated in the accumulation buffer 67 so that overflow or underflow does not occur.

When the processing of step S48 is completed, the encoding processing is completed.

In the above encoding processing, when performing the adaptive loop filter process in step S44, the parameter set in which the maximum number of the number of parameter sets referenced as the adaptive loop filter is defined as a fixed value is set, and in step S46, the bitstream including the set parameter set is generated.

Configuration Example of Image Decoding Device

Figure 10:
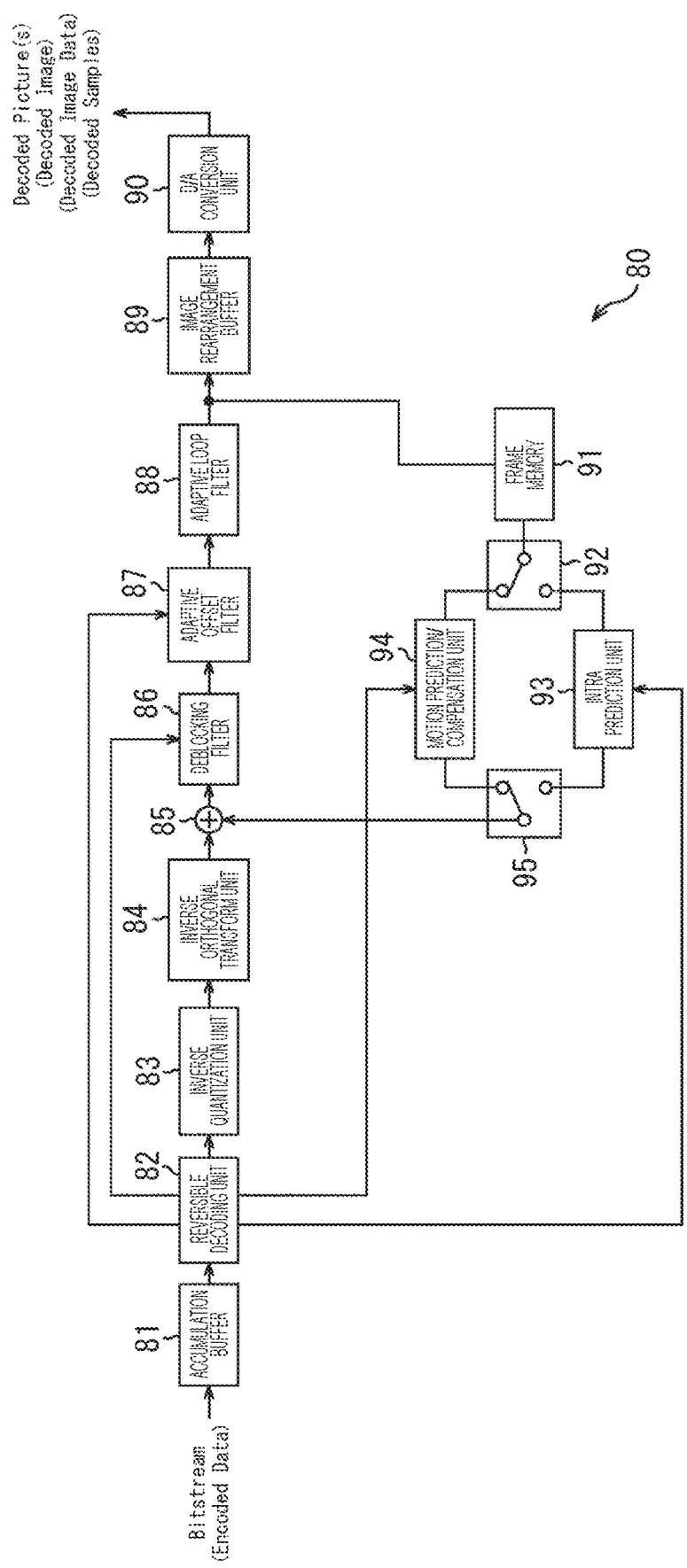
FIG. 10 is a block diagram illustrating a configuration example of an embodiment of an image decoding device.

FIG. 10 illustrates a configuration of an embodiment of the image encoding device as the image processing device to which the present disclosure is applied. The image decoding device 80 illustrated in FIG. 10 is the decoding device corresponding to the image encoding device 60 of FIG. 8.

It is assumed that the encoded stream (encoded data) encoded by the image encoding device 60 is transmitted to the image decoding device 80 corresponding to the image encoding device 60 via a predetermined transmission line and decoded.

As illustrated in FIG. 10, the image decoding device 80 includes an accumulation buffer 81, a reversible decoding unit 82, an inverse quantization unit 83, an inverse orthogonal transform unit 84, a calculation unit 85, a deblocking filter 86, an adaptive offset filter 87, an adaptive loop filter 88, a screen rearrangement buffer 89, a D/A conversion unit 90, a frame memory 91, a selection unit 92, an intra prediction unit 93, a motion prediction/compensation unit 94, and a selection unit 95.

The accumulation buffer 81 is also a receiver that receives the transmitted encoded data. The accumulation buffer 81 receives the transmitted encoded data and accumulates the received encoded data. The encoded data is encoded by the image encoding device 60. The reversible decoding unit 82 decodes the encoded data read from the accumulation buffer 81 at a predetermined timing by a method corresponding to the encoding method of the reversible encoding unit 66 in FIG. 8.

The reversible decoding unit 82 acquires parameters such as information indicating the decoded intra prediction mode from the intra prediction unit 93, and supplies parameters such as information indicating the inter prediction mode or motion vector information to the motion prediction/compensation unit 94. Further, the reversible decoding unit 82 supplies the parameters of the decoded deblocking filter to the deblocking filter 86, and supplies the decoded adaptive offset parameters to the adaptive offset filter 87.

The inverse quantization unit 83 inversely quantizes the coefficient data (quantization coefficient) obtained by being decoding by the reversible decoding unit 82 by the method corresponding to the quantization method of the quantization unit 65 in FIG. 8. That is, the inverse quantization unit 83 performs the inverse quantization of the quantization coefficient by the method similar to the inverse quantization unit 68 in FIG. 8 using the quantization parameters supplied from the image encoding device 60.

The inverse quantization unit 83 supplies the inversely quantized coefficient data, that is, the orthogonal transform coefficient to the inverse orthogonal transform unit 84. The inverse orthogonal transform unit 84 inversely orthogonally transforms the orthogonal transform coefficient by the method corresponding to the orthogonal transform coefficient of the orthogonal transform unit 64 in FIG. 8, and obtains the decoded residual data corresponding to the residual data before the orthogonal transform in the image encoding device 60.

The decoded residual data obtained by the inverse orthogonal transform is supplied to the calculation unit 85. Further, the calculation unit 85 is supplied with the predicted image from the intra prediction unit 93 or the motion prediction/compensation unit 94 via the selection unit 95.

The calculation unit 85 adds the decoded residual data and the predicted image, and obtains decoded image data corresponding to the image data before the predicted image is subtracted by the calculation unit 63 of the image encoding device 60. The calculation unit 85 supplies the decoded image data to the deblocking filter 86.

The deblocking filter 86 suppresses a block distortion of the decoded image by appropriately performing the deblocking filter processing on the image from the calculation unit 85, and supplies the filter processing result to the adaptive offset filter 87. The deblocking filter 86 is basically configured similarly to the deblocking filter 71 illustrated in FIG. 8. That is, the deblocking filter 86 has the parameters β and Tc obtained based on a quantization parameter. The parameters β and Tc are threshold values (parameters) used for determining the deblocking filter.

Note that the parameters β and Tc of the deblocking filter 86 are extended from β and Tc defined by the HEVC method. Each offset of the parameters β and Tc of the deblocking filter encoded by the image encoding device 60 is received by the image decoding device 80 as the parameter of the deblocking filter, decoded by the reversible decoding unit 82, and is used by the deblocking filter 86.

The adaptive offset filter 87 performs the offset filter (SAO) processing for mainly suppressing ringing on the image filtered by the deblocking filter 86.

The adaptive offset filter 87 performs the filter processing on the image filtered by the deblocking filter 86 by using a quad-tree structure in which the type of offset filter is determined for each divided area and offset values for each divided area. The adaptive offset filter 87 supplies the filtered image to the adaptive loop filter 88.

Note that the quad-tree structure and the offset values for each divided area are calculated by the adaptive offset filter 72 of the image encoding device 60, and are encoded and sent as the adaptive offset parameter. Then, the quad-tree structure encoded by the image encoding device 60 and the offset values for each divided region are received by the image decoding device 80 as the adaptive offset parameters, decoded by the reversible decoding unit 82, and used by the adaptive offset filter 87.

The adaptive loop filter 88 performs filter processing on the image filtered by the adaptive offset filter 87 for each processing unit using the filter coefficient, and supplies the filter processing result to the frame memory 91 and the screen rearrangement buffer 89.

Note that although not illustrated in the example of FIG. 10, in the image decoding device 80, the filter coefficient is calculated for each LUC by the adaptive loop filter 73 of the image encoding device 60, and is encoded and transmitted as the adaptive loop filter parameter, and decoded and used by the reversible decoding unit 82.

The screen rearrangement buffer 89 rearranges the images and supplies the rearranged images to the D/A conversion unit 90. That is, the order of the frames rearranged for the encoding order by the screen rearrangement buffer 62 in FIG. 8 is rearranged in the original display order.

The D/A conversion unit 90 D/A-converts the image (decoded picture(s)) supplied from the screen rearrangement buffer 89 and outputs the D/A-converted image to a display (not illustrated) for display. Note that the digital data image may be output as it is without providing the D/A conversion unit 90.

The output of the adaptive loop filter 88 is further supplied to the frame memory 91.

The frame memory 91, the selection unit 92, the intra prediction unit 93, the motion prediction/compensation unit 94, and the selection unit 95 correspond to the frame memory 74 of the image encoding device 60, the selection unit 75, the intra prediction unit 76, the motion prediction/compensation unit 77, and the predicted image selection unit 78, respectively.

The selection unit 92 reads the inter-processed image and the referenced image from the frame memory 91 and supplies the read images to the motion prediction/compensation unit 94. Further, the selection unit 92 reads the image used for the intra prediction from the frame memory 91 and supplies the read image to the intra prediction unit 93.

The information or the like indicating the intra prediction mode obtained by decoding the header information are appropriately supplied from the reversible decoding unit 82 to the intra prediction unit 93. Based on this information, the intra prediction unit 93 generates the predicted image from the reference image acquired from the frame memory 91, and supplies the generated predicted image to the selection unit 95.

The information (prediction mode information, motion vector information, reference frame information, flag, various parameters, or the like) obtained by decoding the header information is supplied from the reversible decoding unit 82 to the motion prediction/compensation unit 94.

Based on this information supplied from the reversible decoding unit 82, the motion prediction/compensation unit 94 generates the predicted image from the reference image acquired from the frame memory 91, and supplies the generated predicted image to the selection unit 95.

The selection unit 95 selects the predicted image generated by the motion prediction/compensation unit 94 or the intra prediction unit 93 and supplies the selected predicted image to the calculation unit 85.

In this way, the image decoding device 80 is configured, and the reversible decoding unit 82 corresponds to the decoding unit 25 of FIG. 1, and the adaptive loop filter 88 corresponds to the filter unit 26 of FIG. 1. Therefore, as described above, the image decoding device 80 can reduce the mounting load required for the image processing.

<Operation of Image Decoding Device>

Figure 11:
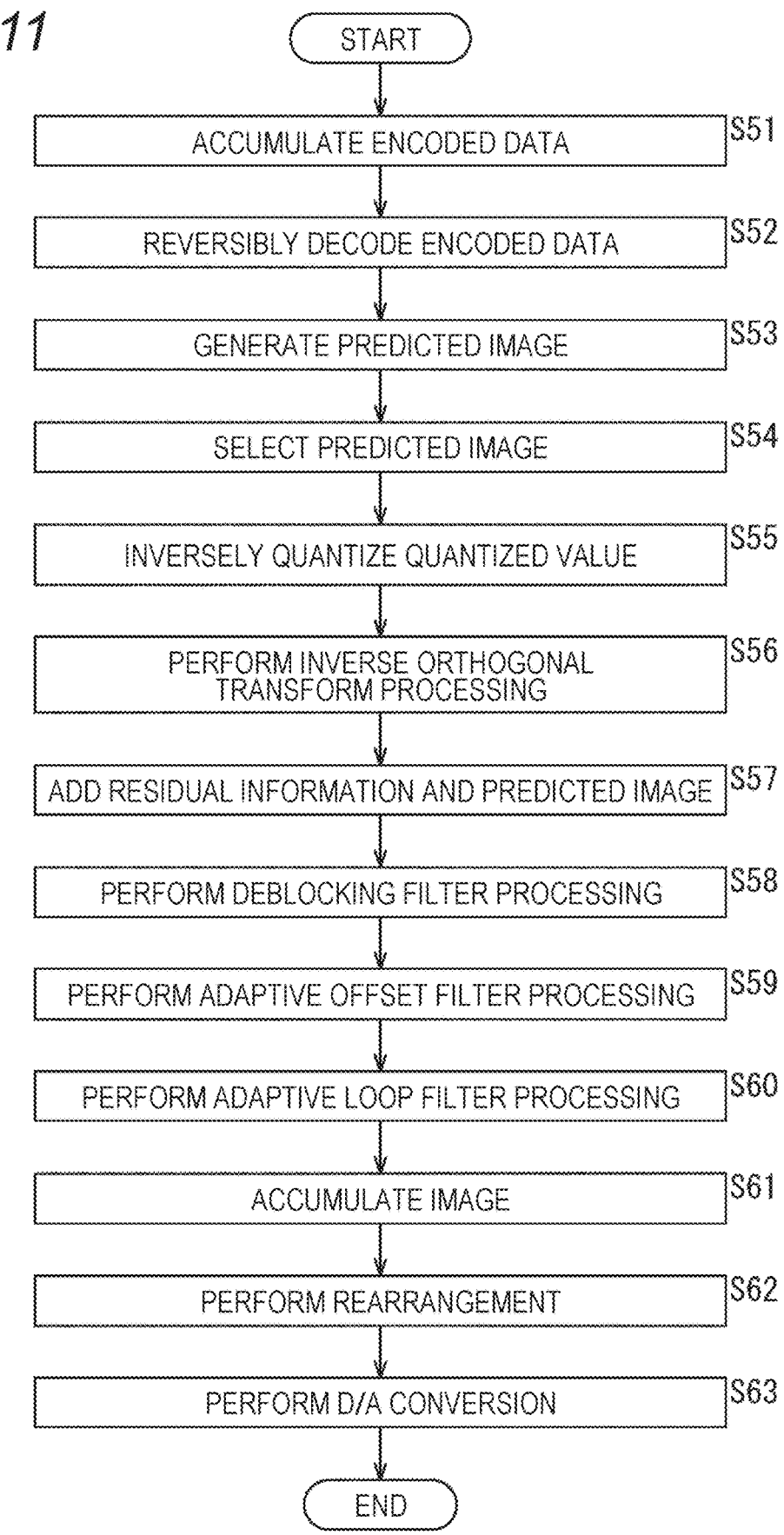
FIG. 11 is a flowchart for describing decoding processing.

An example of the flow of decoding processing executed by the image decoding device 80 as described above will be described with reference to FIG. 11.

When the decoding processing is started, in step S51, the accumulation buffer 81 receives and accumulates the transmitted encoded stream (data). In step S52, the reversible decoding unit 82 decodes the encoded data supplied from the accumulation buffer 81. An I picture, a P picture, and a B picture encoded by the reversible encoding unit 66 of FIG. 8 are decoded.

Prior to decoding the picture, parameter information (intra prediction mode or inter prediction mode) such as the motion vector information, the reference frame information, and the prediction mode information is also decoded.

When the prediction mode information is the intra prediction mode information, the prediction mode information is supplied to the intra prediction unit 93. When the prediction mode information is the inter prediction mode information, the motion vector information corresponding to the prediction mode information is supplied to the motion prediction/compensation unit 94. In addition, the parameters of the deblocking filter and the adaptive offset parameter are also decoded and supplied to the deblocking filter 86 and the adaptive offset filter 87, respectively.

In step S53, the intra prediction unit 93 or the motion prediction/compensation unit 94 performs the predicted image generation processing corresponding to the prediction mode information supplied from the reversible decoding unit 82, respectively.

That is, when the intra prediction mode information is supplied from the reversible decoding unit 82, the intra prediction unit 93 generates the intra predicted image of the intra prediction mode. When the inter prediction mode information is supplied from the reversible decoding unit 82, the motion prediction/compensation unit 94 performs the motion prediction/compensation processing in the inter prediction mode to generate the inter-predicted image.

By this processing, the predicted image (intra-predicted image) generated by the intra prediction unit 93 or the predicted image (inter-predicted image) generated by the motion prediction/compensation unit 94 is supplied to the selection unit 95.

In step S54, the selection unit 95 selects the predicted image. That is, the predicted image generated by the intra prediction unit 93 or the predicted image generated by the motion prediction/compensation unit 94 is supplied. Therefore, the supplied predicted image is selected and supplied to the calculation unit 85, and is added to the output of the inverse orthogonal transform unit 84 in step S57 described later.

In step S52 described above, the conversion coefficient decoded by the reversible decoding unit 82 is also supplied to the inverse quantization unit 83. In step S55, the inverse quantization unit 83 inversely quantizes the conversion coefficient decoded by the reversible decoding unit 82 with the characteristics corresponding to the characteristics of the quantization unit 65 in FIG. 8.

In step S56, the inverse orthogonal transform unit 84 inversely orthogonally transforms the transform coefficient inversely quantized by the inverse quantization unit 83 with the characteristics corresponding to the characteristics of the orthogonal transform unit 64 in FIG. 8. As a result, the difference information corresponding to the input of the orthogonal transform unit 64 in FIG. 8 (the output of the calculation unit 63) is decoded.

In step S57, the calculation unit 85 is selected in the processing of step S54 described above, and adds the predicted image input via the selection unit 95 to the difference information. As a result, the original image is decoded.

In step S58, the deblocking filter 86 performs the deblocking filter processing on the image output from the calculation unit 85. In this case, as the threshold value for the determination regarding the deblocking filter, the parameters β and Tc extended from β and Tc defined by the HEVC method are used. The filtered image from the deblocking filter 86 is output to the adaptive offset filter 87. Note that in the deblocking filter processing, each of the offsets of the parameters β and Tc of the deblocking filter supplied from the reversible decoding unit 82 is also used.

In step S59, the adaptive offset filter 87 performs the adaptive offset filter processing. By this processing, the adaptive offset filter 87 performs the filter processing on the image filtered by the deblocking filter 86 by using the quad-tree structure in which the type of offset filter is determined for each divided area and the offset values for each divided area. The filtered image is fed to the adaptive loop filter 88.

In step S60, the adaptive loop filter 88 performs the adaptive loop filtering processing on the image filtered by the adaptive offset filter 87. The adaptive loop filter 88 performs the filter processing on the input images for each processing unit using the filter coefficient calculated for each processing unit, and supplies the filter processing result to the screen rearrangement buffer 89 and the frame memory 91.

In step S61, the frame memory 91 stores the filtered image.

In step S62, the screen rearrangement buffer 89 rearranges the images after the adaptive loop filter 88, and then supplies the images to the D/A conversion unit 90. That is, the order of the frames rearranged for the encoding order by the screen rearrangement buffer 62 of the image encoding device 60 is rearranged in the original display order.

In step S63, the D/A conversion unit 90 D/A-converts the images rearranged by the screen rearrangement buffer 89 and outputs the D/A-converted images to a display (not illustrated) for display.

When the processing of step S63 ends, the decoding processing ends.

In the above decoding processing, in step S52, the bitstream including the parameter set in which the maximum number of the number of parameter sets referenced as the adaptive loop filter is defined as the fixed value is decoded, and when the adaptive loop filtering process in step S60 is performed, the adaptive loop filter is applied to the decoded image with reference to the decoded parameter set.

Configuration Example of Computer

Next, the above-described series of processing (image processing method) can be performed by hardware or software. When a series of processing is performed by software, the programs constituting the software are installed on a general-purpose computer or the like.

Figure 12:
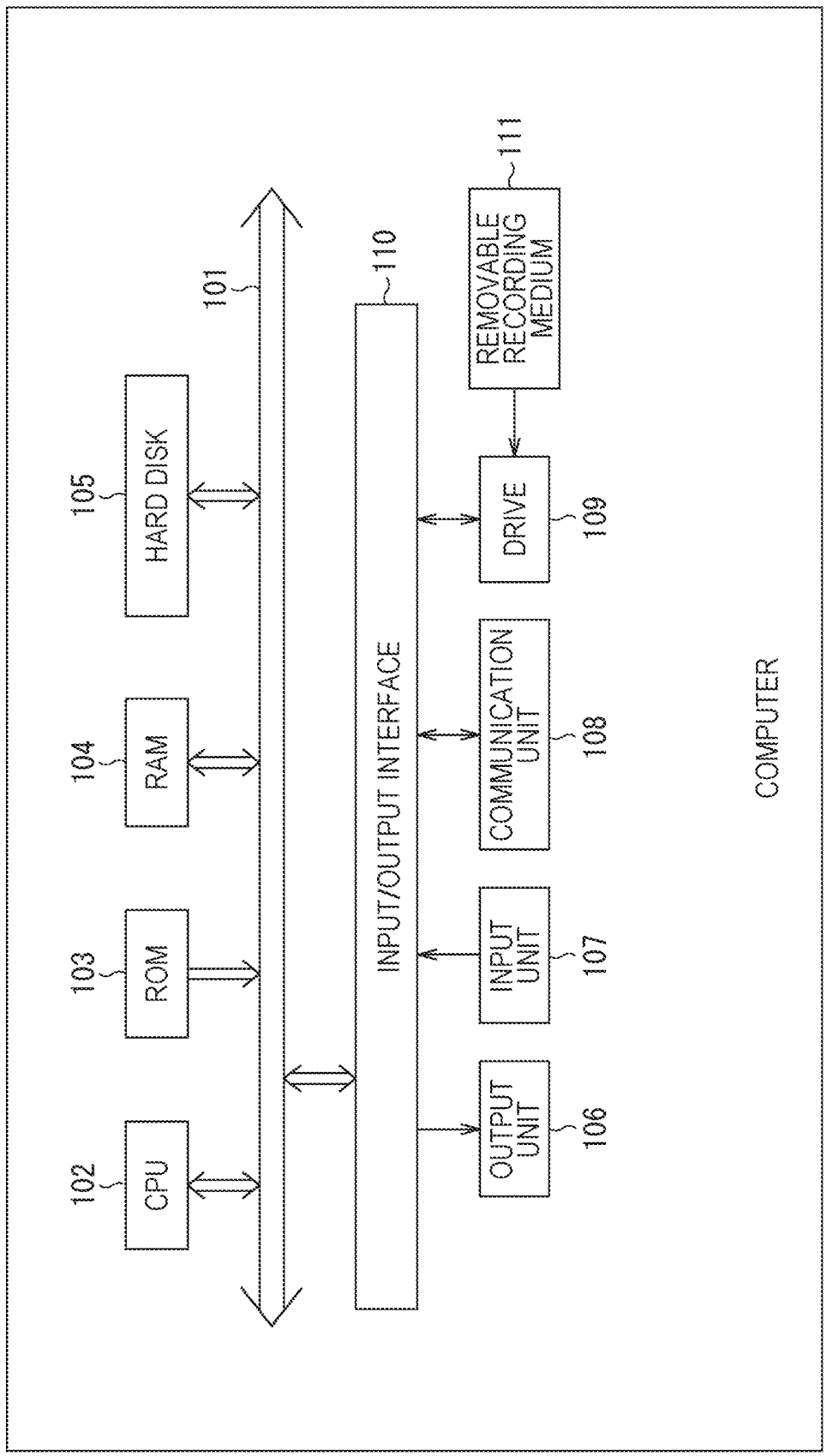
FIG. 12 is a block diagram illustrating a configuration example of an embodiment of a computer to which the present technology is applied.

FIG. 12 is a block diagram illustrating a configuration example of an embodiment of the computer on which the program for executing the above-described series of processes is installed.

The program can be recorded in advance on the hard disk 105 or the ROM 103 as the recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disc, a compact disc read only memory (CD-ROM), a magneto optical (MO) disc, a digital versatile disc (DVD), a magnetic disc, a semiconductor memory, and the like.

Note that the program can be not only installed on the computer from the removable recording medium 111 as described above, but can also be downloaded to the computer via a communication network or a broadcasting network and installed on the built-in hard disk 105. That is, for example, the program can be transmitted wirelessly from a download site to a computer via an artificial satellite for digital satellite broadcasting, or can be transmitted to a computer by wire via a network such as a local area network (LAN) or the Internet.

The computer has a built-in central processing unit (CPU) 102, and the input/output interface 110 is connected to the CPU 102 via the bus 101.

When a command is input by a user via the input/output interface 110 by operating the input unit 107 or the like, the CPU 102 executes the program stored in the read only memory (ROM) 103 accordingly. Alternatively, the CPU 102 loads the program stored in the hard disk 105 into a random access memory (RAM) 104 and executes the loaded program.

As a result, the CPU 102 performs processing according to the above-described flowchart or processing performed according to the configuration of the above-described block diagram. Then, the CPU 102 outputs the processing result from the output unit 106 from the communication unit 108, or transmits the processing result from the communication unit 108 via, for example, the input/output interface 110, as necessary, and furthermore records the processing result on the hard disk 105.

Note that the input unit 107 is constituted by a keyboard, a mouse, a microphone, and the like. In addition, the output unit 106 is constituted by a liquid crystal display (LCD), a speaker, or the like.

Here, in the present specification, the processing performed by the computer according to the program does not necessarily have to be performed in a time sequence according to the order described as the flowchart. That is, the processing performed by the computer according to the program also includes processing (for example, parallel processing or processing by an object) executed in parallel or individually.

Further, the program may be processed by one computer (processor) or may be distributed and processed by a plurality of computers. Furthermore, the program may be transmitted to a distant computer and executed.

Further, in the present specification, the system means a set of a plurality of components (devices, modules (parts), etc.), and it does not matter whether all the components are in the same housing. Therefore, any of a plurality of devices housed in separate housings and connected via a network and one device in which a plurality of modules is housed in one housing are systems.

Further, for example, the configuration described as one device (or processing unit) may be divided and configured as a plurality of devices (or processing units). On the contrary, the configurations described above as a plurality of devices (or processing units) may be collectively configured as one device (or processing unit). Further, of course, a configuration other than the above may be added to the configuration of each device (or each processing unit). Further, when the configuration and operation of the entire system are substantially the same, a part of the configuration of one device (or processing unit) may be included in the configuration of another device (or other processing units).

In addition, for example, the present technology can be configured as cloud computing in which one function is shared by a plurality of devices via a network and processed jointly.

Further, for example, the above-described program can be executed in any device. In that case, the device may have necessary functions (functional blocks, or the like) so that necessary information can be obtained.

Further, for example, each step described in the above-described flowchart can be executed by one device, and can also be shared and executed by a plurality of devices. Furthermore, when one step includes a plurality of processes, the plurality of processes included in the one step can be executed by one device or shared and executed by a plurality of devices. In other words, a plurality of processes included in one step can be executed as processes of a plurality of steps. Conversely, the processes described as a plurality of steps can be collectively executed as one step.

Note that the program executed by the computer may be such that the processing of the steps for describing the program is executed in chronological order in the order described in this specification, or may be executed in parallel or individually at the required timing, such as when a call is made. That is, as long as there is no contradiction, the processing of each step may be executed in an order different from the above-described order. Further, the processing of the step for describing this program may be executed in parallel with the processing of another program, or may be executed in combination with the processing of another program.

It should be noted that the present techniques described in the present specification can be each implemented independently as long as there is no contradiction. Of course, any plurality of the present technologies can be used in combination. For example, some or all of the techniques described in any of the embodiments may be combined with some or all of the techniques described in other embodiments. In addition, it is possible to carry out a part or all of any of the above-mentioned techniques in combination with other techniques not described above.

Example of Configuration Combination

Note that the present technology may also be configured as below.

(1)

An image processing device, including:
a decoding unit configured to decode a bitstream including a parameter set in which the maximum number of parameter sets referenced as an adaptive loop filter is defined as a fixed value to generate a decoded image; and
a filter unit configured to reference the parameter set decoded by the decoding unit and apply the adaptive loop filter to the decoded image generated by the decoding unit.

(2)

The image processing device according to the above (1), in which
the maximum number is a fixed value that does not depend on the number of tiles dividing a slice.

(3)

The image processing device according to the above (1) or (2), in which
the maximum number is the fixed value defined for each level.

(4)

The image processing device according to any one of the above (1) to (3), in which
the parameter set is an adaptation parameter set (APS).

(5)

The image processing device according to any one of the above (1) to (4), in which
the maximum number is a fixed value defined for each aps_params_type.

(6)

The image processing device according to any one of the above (1) to (5), in which
the maximum number is defined for each aps_params_type, and is fixed value different for each level.

(7)

An image processing method, including:
a decoding process of decoding a bitstream including a parameter set in which the maximum number of parameter sets referenced as an adaptive loop filter is defined as a fixed value to generate a decoded image; and
applying the adaptive loop filter to the decoded image generated in the decoding process by referencing the parameter set decoded in the decoding process.

(8)

An image processing device, including:
a setting unit configured to set a parameter set in which the maximum number of parameter sets referenced as an adaptive loop filter is defined as a fixed value; and
an encoding unit configured to encode an image to generate a bitstream including the parameter set that is set by the setting unit.

(9)

The image processing device according to the above (8), further including:
a filter unit configured to apply the adaptive loop filter to a locally encoded image when the encoding is performed in the encoding unit,
in which the encoding unit encodes the image using a filtered image to which the adaptive loop filter is applied by the filter unit.

(10)

An image processing method, including:
a setting process of setting a parameter set in which the maximum number of parameter sets referenced as an adaptive loop filter is defined as a fixed value; and
an encoding process of encoding an image to generate a bitstream including the parameter set that is set in the setting process.

Note that the embodiment of the present technology is not limited to the above-described embodiment, and various changes can be made without departing from the gist of the present disclosure. In addition, the effects described in the present specification are merely examples and are not limited, and other effects may be obtained.

REFERENCE SIGNS LIST

11 Image processing system
12 Image encoding device
13 Image decoding device
21 Setting unit
22 Encoding unit
23 Filter unit
24 Database
25 Decoding unit
26 Filter unit
27 Database

The invention claimed is:

1. An image processing device, comprising:
   circuitry configured to
   decode a bitstream including an adaptation parameter set in which a maximum number of adaptation parameter sets referenced as an adaptive loop filter is defined as a fixed value to generate a decoded image; and
   reference the adaptation parameter set decoded by the decoding unit circuitry and apply the adaptive loop filter to the decoded image generated by the circuitry,
   wherein the maximum number is defined for each aps_params_type, the aps_params_type specifies a type of adaptation parameter set parameters, and the maximum number is a fixed value.

2. The image processing device according to claim 1, wherein
   the maximum number does not depend on the number of tiles dividing a slice.

3. The image processing device according to claim 1, wherein the decoded image is a celestial spherical image.

4. An image processing method, comprising:
   a decoding process of decoding a bitstream including an adaptation parameter set in which a maximum number of adaptation parameter sets referenced as an adaptive loop filter is defined as a fixed value to generate a decoded image; and
   applying the adaptive loop filter to the decoded image generated in the decoding process by referencing the adaptation parameter set decoded in the decoding process,
   wherein the maximum number is defined for each aps_params_type, the aps_params_type specifies a type of adaptation parameter set parameters, and the maximum number is a fixed value.

5. The image processing method according to claim 4, wherein the decoded image is a celestial spherical image.

6. An image processing device, comprising:
   circuitry configured to
   set an adaptation parameter set in which a maximum number of adaptation parameter sets referenced as an adaptive loop filter is defined as a fixed value; and
   encode an image to generate a bitstream including the adaptation parameter set that is set by the circuitry,
   wherein the maximum number is defined for each aps_params_type, the aps_params_type specifies a type of adaptation parameter set parameters, and the maximum number is a fixed value.

7. The image processing device according to claim 6, wherein the circuitry is further configured to
   apply the adaptive loop filter to a locally encoded image when the encoding is performed,
   wherein the circuitry encodes the image using a filtered image to which the adaptive loop filter is applied by the circuitry.

8. The image processing device according to claim 6, wherein the image is a celestial spherical image.

9. An image processing method, comprising:
   setting an adaptation parameter set in which a maximum number of adaptation parameter sets referenced as an adaptive loop filter is defined as a fixed value; and
   encoding an image to generate a bitstream including the adaptation parameter set that is set in the setting,
   wherein the maximum number is defined for each aps_params_type, the aps_params_type specifies a type of adaptation parameter set parameters, and the maximum number is a fixed value.

10. The image processing method according to claim 9, wherein the image is a celestial spherical image.

* * * * *